Aug. 7, 1956 L. R. KIRKWOOD ET AL 2,758,155
TELEVISION COLOR SYNCHRONIZATION
Filed Sept. 28, 1951
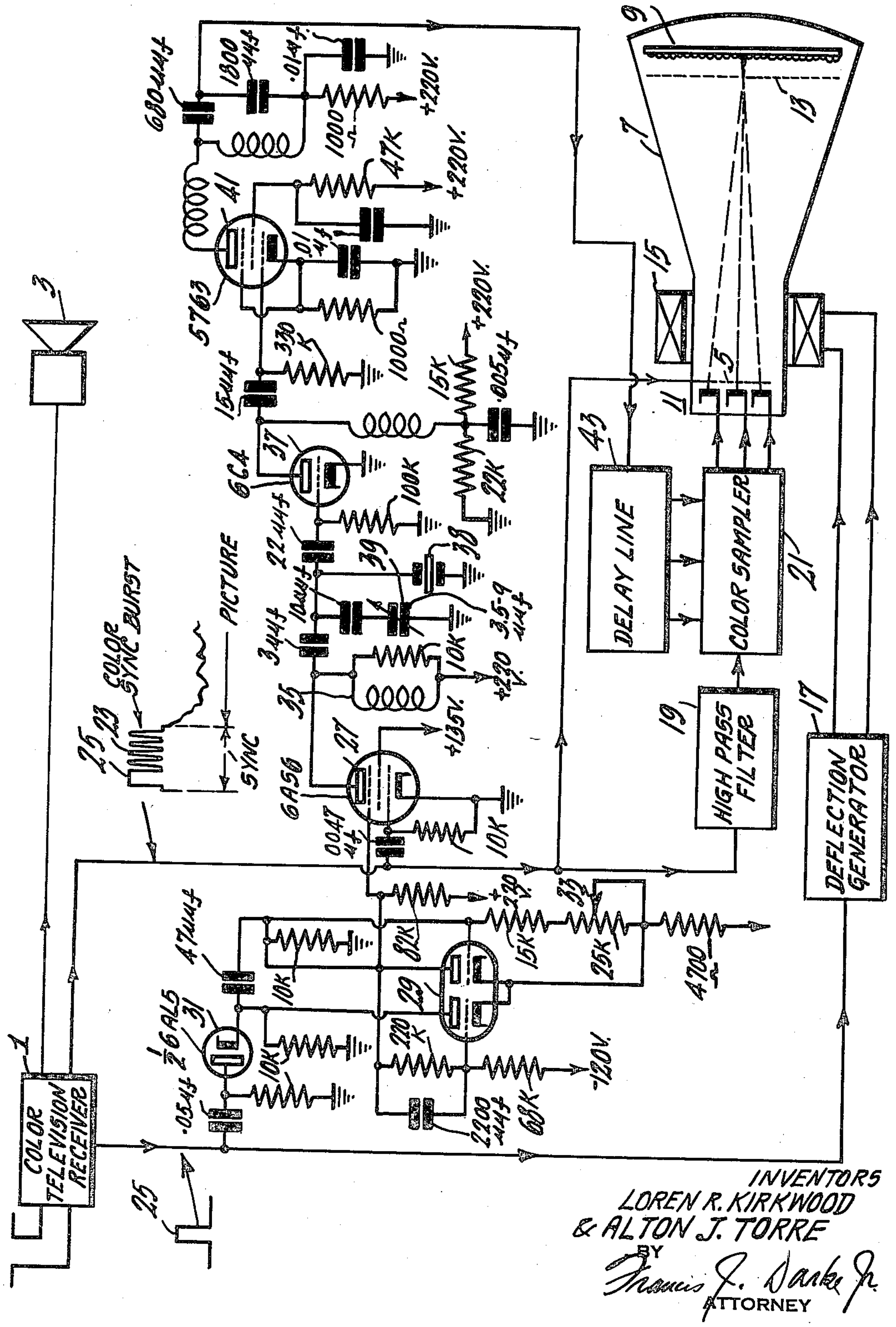
INVENTORS
LOREN R. KIRKWOOD
& ALTON J. TORRE
BY
Francis J. Darke Jr.
ATTORNEY United States Patent Office 2,758,155

Patented Aug. 7, 1956

2,758,155

TELEVISION COLOR SYNCHRONIZATION

Loren R. Kirkwood, Oaklyn, and Alton J. Torre, Westmont, N. J., assignors to Radio Corporation of America, a corporation of Delaware Application September 28, 1951, Serial No. 248,776

7 Claims. (Cl. 178—5.4)

This invention relates to television and more particularly to color synchronization of the type employed in color television receivers.

The reproduction on the viewing screen of a receiver of images in natural color requires not only an expression of the relative luminescences or brightness but there must also be conveyed the color hues and saturation or chromaticities of elemental areas of the original scene.

The transfer of images in their natural color may be accomplished by additive methods. Additive methods produce natural color images by dividing the light from an object into a predetermined number of selected primary or component colors. Color images may be transferred electrically by analyzing the light from an object into not only its image elements as is accomplished by normal scanning procedure but by also analyzing the light from elemental areas of objects or images into selected primary or component colors and deriving therefrom a signal train representative of each of selected component colors. A color image may be then reproduced at a remote point by appropriate reconstruction from the developed signal train.

In order to utilize the existing radio frequency spectrum most advantageously there has been proposed a color television system based upon the signal multiplex principal which will be referred to herein as a "phase and amplitude modulated subcarrier wave" type. In such a system, the video signal components representative of the brightness detail are transmitted substantially in the usual manner for transmission of the black and white television signals. Color information is employed to modulate a subcarrier wave having a carrier frequency lying within the frequency passband of the aforementioned video signals carrying the brightness detail. The subcarrier wave is phase modulated in accordance with the particular component color being scanned while the same subcarrier is amplitude modulated in accordance with the chroma of the color being scanned. The system referred to is described in more detail beginning on page 122 of "Electronics" for November 1949.

Scanning synchronism between the transmitter and receiver is essential in the successful operation of television equipment. As a result, much emphasis is placed on the development and utilization of synchronizing methods. This is especially true in color television wherein not only is it necessary to maintain accurate deflection scanning but it is also necessary to maintain accurate synchronism in the timing of component color selection.

It will be seen that the reproduction of the proper color in the receiver is dependent upon accurate timing of the color selection in the receiver. Synchronism is accomplished by the periodic transmission of a 3.89 megacycle "burst" of signal wave which is equal in frequency to the unmodulated subcarrier carrying the color information.

A good description of the employment of the "burst" for color synchronization may be found in an article entitled "Recent Developments in Color Synchronization in the RCA Color Television System" published February 1950 by the Radio Corporation of America.

It is a primary object of the present invention to improve the timing of the color selection in a color television receiver.

Another object of this invention is to permit more accurate selection of color information.

According to this invention, a crystal oscillator circuit having a frequency of response equal to the burst frequency drives the color sampler. The burst is separated from the video signal by gating and applied directly to the crystal for phase control.

Other and incidental objects of the invention will become apparent upon a reading of the following specification and inspection of the accompanying drawing which shows by block and circuit diagram one form of the present invention.

Turning now in more detail to the drawing there is provided a color television receiver 1 which includes the appropriate circuits for developing video signals and sound signals. Suitable color television receivers may be found well shown and described in the publication entitled "General Description of Receivers for the RCA Color Television System which Employs the RCA Direct-View-Tri-Color Kinescopes" dated April 1950 and published by the Radio Corporation of America. The sound signals are applied to the loud speaker 3.

Video signal is obtained from a color television receiver 1 and is applied to the control electrode 5 of a color image reproducing device or tri-color kinescope 7. It is not the intention here to limit the practice of the present invention to any single type of color image reproducing device. For the purpose of explanation of the operation of this invention, the three gun tri-color kinescope will be illustrated. The color kinescope 7 includes a luminescent screen 9 formed of a multiplicity of small phosphor dots of sub-elemental dimensions and arranged in groups to be capable of producing the selected component colors when excited by the particular color designated electron beam from gun structure 11.

An apertured mask 13 is interposed between the three guns 11 and the dot-phosphor screen 9 in such a manner that the electrons from any one gun can strike only a single color phosphor no matter which part of the raster is being scanned. The mask 13 is comprised of a sheet of metal spaced from the phosphor screen. In a model which has operated satisfactorily the mask 13 contains 117,000 holes, or one hole for each of the tri-color-dot groups. This hole is so registered with its associated dot group that the difference in the angle of approach of the three oncoming beams determines the color. Thus, three color signals applied to the three guns 11 produce independent pictures in the three selected component colors, the pictures appering to the eye to be superimposed because of the close spacing of the very small phosphor dots. A further description of the operation and structure of the tri-color kinescope may be found in an article entitled, "General Description of Receivers for Dot-Sequential Color Television System which Employ Direct View Tri-Color Kinescopes" published in the RCA Review for June 1950.

The article referred to immediately above also shows arrangements for obtaining high voltage supply, color purification and dynamic convergence energy which are necessary for the proper operation of the color reproducer. The details of such elements do not form a part of this invention and will therefore be omitted from the drawing and specification.

A suitable scanning deflection yoke 15 or other deflecting means is provided for scanning. Appropriate scanning deflection energy for deflection coil 15 is supplied by deflection generator 17, which may also take any of the well known forms employed in the television art. Details concerning deflection may be found in an article entitled "Television Deflection Circuits" by A. E. Friend published in the RCA Review for March 1947.

It will be noted that the incoming video signal from the color television receiver 1 is applied to the control electrode 5 which is common to all the cathodes of cathode gun structure 11 of kinescope 7. This path is essentially the same as the output system of conventional black and white receivers except in an actually constructed and operating equipment there is included a delay circuit and a video peaking circuit which is not shown here.

A second signal path for the video signal from color television receiver 1 feeds a simple high pass filter 19 whose bandpass characteristic is adjusted to contain the low frequency color information on the subcarrier. If, for example, a carrier frequency of 3.89 megacycles is selected, the bandpass characteristic of filter 19 will include nominally 2–4 megacycles. This will include the subcarrier of 3.89 megacycles and one of its sidebands. In order to cause the proper electron beam to excite the designated color phosphor on screen 9 to the extent desired, it is necessary to appropriately bias the cathodes of the gun structure 11. This action is accomplished in color sampler 21. This color sampler 21 may consist of three phase and amplitude detectors or gating tubes.

The signal obtained from filter 19 is applied to the sampler 21.

There are three separate phase indicating potentials developed in color sampler 21. Each phase indicating potential is representative of the phase difference between the color synchronizing burst and a different one of the three single frequency datum signals having relative phase displacement with respect to one another of 120°. The phase indicating potentials are applied respectively to the cathodes of the different electron guns of the gun structure 11. It is, of course, essential to the proper operation of the color sampler 19 regardless of the form it might take that it be furnished a control signal accurate with respect to the transmitter in phase and frequency to enable proper color selection.

In order to accurately time the color selection in the receiver, a color synchronizing burst 23 is transmitted immediately following the deflection scanning synchronizing pulses 25. This is shown in the wave form illustrated at the video output of the television receiver 1.

The elements shown in the form of a circuit diagram are employed in accordance with this invention for accurately timing the color sampler 21 in order that it will cause the proper color reproduction in the tri-color kinescope 7.

In order to provide sampling frequency synchronization, it is necessary to separate from the composite video signal obtained from color television receiver 1, a color synchronizing signal which consists of a "burst" of 3.89 megacycles signal 23 located on the "back-porch" of the transmitted signal. This is done by gating the burst amplifier 27 in synchronization with the horizontal synchronizing pulse rate of the received signal so that gating tube 27 is operative only during a period of time corresponding to the "back-porch." The gating signal used to accomplish this is produced by multivibrator tube 29 which is driven by the following edge of horizontal synchronizing pulse 25 obtained from the synchronizing pulse separation circuit included in color television receiver 1. This is the same horizontal pulse that is employed to drive a horizontal deflection generator included in deflection generator 17.

Feed back from the multivibrator tube 29 to the synchronizing signal source in the receiver 1 is minimized by diode 31. The width of the gating pulse may be adjusted by means of variable resistance 33, the multivibrator width control. The plate circuit of tube 27 is tuned to 3.89 megacycles by means of inductance 35. The signal across inductance 35 is applied to the control electrode of tube 37 which is a highly stabilized crystal-controlled oscillator. In actual operation it has been found satisfactory to adjust the amplitude of the "burst" signal to approximately 1½ times the amplitude of the oscillator grid-signal amplitude. Condenser 39 permits vernier adjustment of the crystal-oscillator frequency to establish synchronism with the incoming "burst" frequency. Locking then results and phase and frequency of the oscillator are held in step with the incoming "burst" signal. Crystal 38 is ground so that the circuit will oscillate at the sampling frequency of 3.89 megacycles.

The output of crystal oscillator tube 37 which has been locked-in with the incoming burst signal is applied to amplifier 41 which in turn feeds a lumped-constant delay line shown by block 43.

Details concerning the delay line 43 may be found in any of the text books including information on the delay lines. The first sections of the delay line 43 may serve to eliminate harmonics generated in tube 41 and to provide an impedance match between tube 41 and the subsequent sections of the delay line 43. Signals are taken from the delay line 43 at three intervals at which the phase at the signals differ by 120°. These sampling voltages are applied to the gating control electrodes of the sampling tubes of color sampler 21.

It will be seen that the color sampler control energy received from delay line 43 will cause there to be applied at the gun structure 11 the color signal which is representative of the component color being scanned at the transmitter at that instant. If, for example, a red point on the image at the transmitter is being scanned at a particular instant the transmitted signal will include a subcarrier whose frequency is equal to the frequency of the "burst" and whose phase difference is an indication of the red color. At that particular instant as a result of the application of a frequency equal to the burst frequency being applied to the delay line 43 and hence to the color sampler 21 only the red representative cathode of gun structure 11 will be biased to permit electrons to flow to the target area 9 and produce only a red color. The same action is true during the scanning of a green or a blue element of the image except that the phase of the phase and amplitude modulated subcarrier is different.

In the above description of the operation of the present invention a color synchronizing burst frequency of 3.89 megacycles was employed. It is not intended to limit the practice of this invention to that particular frequency, or the particular sampling angles mentioned. That particular frequency has been successfully employed in the operation of the present invention.

There is also included in the drawing capacitive and resistance values as well as tube types. These indicated values and tube types are also given for illustrative purposes and it is not intended to limit the invention thereto. The values illustrated in the drawing have proved very satisfactory in operation.

Having thus described the invention, what is claimed is:

1. In a color television receiver for receiving a transmitted television image information signal wave which includes a subcarrier wave that has been phase and amplitude modulated by the transmitted image color information, the signal wave also including line and field deflection synchronizing pulses and a color synchronizing burst following each of the line synchronizing pulses; said receiver including means for producing selected component color images, means for separating each burst from said signal wave, an oscillator means for generating at the receiver a reference wave of substantially the same frequency as said sub-carrier wave, said oscillator means including a crystal responsive in frequency to the frequency of the burst, and means for applying each separate individual burst to said crystal to stabilize the frequency and phase of said reference wave, and means for applying the reference wave generated by said oscillator means to the received signal at different phases of the reference wave to enable the image reproducing means to reproduce the signals in the respective component colors.

2. In a color television receiver adapted to receive a transmitted television image information signal wave which includes a subcarrier wave that has been phase and amplitude modulated by the transmitted image color information, the signal wave also including line and field deflection synchronizing pulses and a color synchronizing burst following each of the line synchronizing pulses; said receiver also including means for producing selected component color images, means for separating each burst from said signal wave, an oscillation generating means for developing at the receiver a reference wave of the same frequency as said color synchronized burst, said oscillation generating means including a crystal responsive in frequency to the frequency of said color synchronized burst, said oscillation generating means also including a variable reactance frequency control means, and means for applying each separate individual color synchronizing burst to said crystal to stabilize the frequency and phase of said reference wave, and means for applying the reference wave generated by said oscillation generating means to the received signal at different phases of the reference wave to enable the image reproducing means to reproduce the signals in the respective component colors.

3. In a color television receiving system employing a color synchronizing burst for color synchronization, said synchronizing burst consisting of a time separated group of oscillations, a color synchronizer comprising in combination a color sampler, an oscillator connected to said color sampler for driving said color sampler, said oscillator having a frequency stabilizing element including a piezo-electric crystal for stabilizing the frequency of said oscillator and means for applying said synchronizing burst to said piezo-electric crystal.

4. In a color television system of the type employing a color synchronizing burst, said synchronizing burst comprising a recurring group of oscillations, a color synchronizing circuit comprising in combination an oscillator including a piezo-electric crystal responsive to the frequency of said burst, means for applying said color synchronizing burst across said piezo-electric crystal to properly phase the oscillations of said piezo-electric crystal, a color selector sampler having a frequency control terminal, and an operative connection between said oscillator and said color sampler frequency control terminal.

5. The invention as described in claim 4 and wherein there is included a variable capacity connected in parallel with said piezo-electric crystal.

6. In a color television system of the type employing a color synchronizing burst, said synchronizing bursts comprising an isolated series of oscillations, a color synchronizing circuit comprising in combination an oscillator including a piezo-electric crystal circuit responsive to the frequency of said burst, means for applying said color synchronizing burst in the form of a series of oscillations to said crystal circuit, said burst applying means having a burst gate circuit operative to pass only said color synchronizing burst to said crystal circuit, a color selector having frequency control terminal, and an operative connection between said oscillator and said color selector frequency control terminal.

7. In a color television system of the type wherein there is employed a subcarrier whose phase with respect to the phase of a reference signal burst is indicative of color information, a color synchronizing circuit for synchronizing a color receiver comprising in combination a color selector, a piezo-electric crystal cut to the frequency of said reference signal burst, means for driving said color selector with said piezo-electric crystal and means for applying said reference signal burst across said piezo-electric crystal for periodically phasing said piezo-electric crystal oscillations with said reference signal burst.

References Cited in the file of this patent

UNITED STATES PATENTS

| | | |
|---|---|---|
| 2,378,746 | Beers | June 19, 1945 |
| 2,399,421 | Artzt | Apr. 30, 1946 |
| 2,539,465 | Parker | Jan. 30, 1951 |
| 2,554,693 | Bedford | Sept. 4, 1951 |
| 2,566,707 | Sziklai | Sept. 4, 1951 |
| 2,580,903 | Evans | Jan. 1, 1952 |
| 2,594,380 | Barton | Apr. 29, 1952 |
| 2,621,244 | Landon | Dec. 9, 1952 |
| 2,653,187 | Luck | Sept. 22, 1953 |
| 2,689,880 | Hollywood | Sept. 21, 1954 |

OTHER REFERENCES

Two-Color Direct-View Receiver, RCA, Nov. 1949.